US012253837B2

(12) United States Patent
Bellay et al.

(10) Patent No.: US 12,253,837 B2
(45) Date of Patent: Mar. 18, 2025

(54) CAUSAL RELATIONAL ARTIFICIAL INTELLIGENCE AND RISK FRAMEWORK FOR MANUFACTURING APPLICATIONS

(71) Applicant: Battelle Memorial Institute, Columbus, OH (US)

(72) Inventors: Jeremy Bellay, Columbus, OH (US); Shelly DeForte, Canal Winchester, OH (US); Nicholas Darby, Columbus, OH (US); Kurtis Wickey, Springfield, OH (US)

(73) Assignee: Battelle Memorial Institute, Columbus, OH (US)

( * ) Notice: Subject to any disclaimer, the term of this patent is extended or adjusted under 35 U.S.C. 154(b) by 411 days.

(21) Appl. No.: 17/726,617

(22) Filed: Apr. 22, 2022

(65) Prior Publication Data

US 2022/0342371 A1    Oct. 27, 2022

Related U.S. Application Data

(60) Provisional application No. 63/178,982, filed on Apr. 23, 2021.

(51) Int. Cl.
*G05B 13/02* (2006.01)
*G06F 18/214* (2023.01)
*G06F 18/2323* (2023.01)

(52) U.S. Cl.
CPC ......... *G05B 13/027* (2013.01); *G06F 18/214* (2023.01); *G06F 18/2323* (2023.01)

(58) Field of Classification Search
None
See application file for complete search history.

(56) References Cited

U.S. PATENT DOCUMENTS

2007/0294187 A1* 12/2007 Scherrer ............. H04L 63/1425
                                                                705/75
2009/0228408 A1*  9/2009 Kaushal ................... G06N 5/04
                                                                714/26

(Continued)

OTHER PUBLICATIONS

International Preliminary Report on Patentability of International Application No. PCT/US2022/025869, mail date Nov. 2, 2023. 9 pages.

(Continued)

*Primary Examiner* — David Earl Ogg
(74) *Attorney, Agent, or Firm* — Grossman, Tucker, Perreault & Pfleger, PLLC; Donald G. Weiss (57) ABSTRACT

In an approach to CRAI and risk framework for manufacturing applications, a computer-implemented method for causal effect prediction includes identifying, by one or more computer processors, an intervention, where the intervention is selected from the group consisting of threats, failures, corrections, and relevant outputs; collecting, by the one or more computer processors, process dependency data; creating, by the one or more computer processors, an intervention model; combining, by the one or more computer processors, the process dependency data and the intervention model to create a combined process dependency graph; training, by the one or more computer processors, a causal relational artificial intelligence (CRAI) model; and determining, by the one or more computer processors, an estimate of an intervention efficacy.

20 Claims, 7 Drawing Sheets

(56) References Cited

U.S. PATENT DOCUMENTS

| | | | | |
|---|---|---|---|---|
| 2009/0240366 | A1* | 9/2009 | Kaushal | G06N 20/00 |
| | | | | 700/110 |
| 2012/0209798 | A1* | 8/2012 | Kaushal | G06N 5/02 |
| | | | | 706/13 |
| 2019/0318288 | A1* | 10/2019 | Noskov | G06N 7/01 |
| 2021/0089353 | A1 | 3/2021 | Shear et al. | |
| 2022/0067622 | A1* | 3/2022 | Devarakonda | G07C 3/08 |

OTHER PUBLICATIONS

International Search Report and Written Opinion from corresponding PCT Appln. No. PCT/US22/25869, mail date Aug. 18, 2022.
Liu, et al., "Total Ionizing Dose Hardening of 45 nm FD-SOI MOSFETs Using Body-Tie Biasing", IEEE Acess, vol. 7, pp. 51276-51283, 2019.
Barnaby, et al., "Total-Ionizing-Dose Effects on Isolation Oxides in Modern CMOS Technologies", Nuclear Instruments and Methods in Physics Research B 261, pp. 1142-1145, 2007.
Shaneyfelt, et al., "Challenges in Hardening Technologies Using Shallow-Trench Isolation", United States: N. p., 1998, web, https://doi.org/10.2172/650373.
News Announcement, "SkyWater Licenses Key FDSOI Technology from MIT Lincoln Laboratory, Moves Up Availability of its 90 nm Strategic Rad-Hard by Process Offering", Skywater Technology, 2 pages, 2020.

* cited by examiner

CAUSAL RELATIONAL ARTIFICIAL INTELLIGENCE AND RISK FRAMEWORK FOR MANUFACTURING APPLICATIONS

CROSS-REFERENCE TO RELATED APPLICATIONS

The present application claims the benefit of the filing date of U.S. Provisional Application Ser. No. 63/178,982, filed Apr. 23, 2021, the entire teachings of which application is hereby incorporated herein by reference.

TECHNICAL FIELD

The present application relates generally to semiconductor manufacturing and, more particularly, to a system and method for manufacturing process control using Causal Relational Artificial Intelligence (CRAI) and risk framework for manufacturing applications.

BACKGROUND

Modern microelectronics manufacturing produces a vast amount data. Due to the progressive structure of the manufacturing process, the data exhibits natural dependency and is highly correlated. Defects are often detected during end of line testing. Determining the cause of the defect is extremely time consuming and arduous and there is a need for methods that reduce the effort and increase the likelihood of correctly detecting a manufacturing defect. A similar need is present in diagnosing manufacturing perturbations caused by malicious actors.

Artificial Intelligence (AI) can be defined as the theory and development of computer systems able to perform tasks that normally require human intelligence, such as speech recognition, visual perception, decision-making, and translation between languages. The term AI is often used to describe systems that mimic cognitive functions of the human mind, such as learning and problem solving.

SUMMARY

In one illustrative embodiment, a computer-implemented method for causal effect prediction includes: identifying, by one or more computer processors, an intervention; collecting, by the one or more computer processors, process dependency data; creating, by the one or more computer processors, an intervention model; combining, by the one or more computer processors, the process dependency data and the intervention model to create a combined process dependency graph; training, by the one or more computer processors, a causal relational artificial intelligence (CRAI) model; and determining, by the one or more computer processors, an estimate of an intervention efficacy.

In another illustrative embodiment, a system for causal effect prediction includes: one or more computer processors; one or more computer readable storage media; and program instructions stored on the one or more computer readable storage media for execution by at least one of the one or more computer processors, the stored program instructions including instructions to: identify an intervention; collect process dependency data; create an intervention model; combine the process dependency data and the intervention model to create a combined process dependency graph; train a causal relational artificial intelligence (CRAI) model; and determine an estimate of an intervention efficacy.

BRIEF DESCRIPTION OF THE DRAWINGS

Reference should be made to the following detailed description which should be read in conjunction with the following figures, wherein like numerals represent like parts.

DETAILED DESCRIPTION

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Propensity modelling is a statistical approach and a set of techniques which attempts to estimate the likelihood of an intervention, given a set of covariates. This intervention can then be linked to outcomes (e.g., a future failure of a semiconductor integrated circuit) by accounting for independent variables (covariates) and confounding variables that affect such behavior. A propensity model should be dynamic, retraining and continuously evolving based on the feedback loop created by the data pipeline. As new data becomes available, the model needs to change to become smarter and more accurate based on the underlying trends in the data.

Covariates are variables that explain a part of the variability in the outcome. Covariates are not influenced by the intervention, and do not change the relationship between the intervention and the outcome. On their own, covariates predict at least part of the outcome in both the intervention group and the comparison/control group. In other words, covariates contribute to the outcome but may not be related to each other.

Confounders are variables that are related to both the intervention and the outcome. Two variables are confounded when their effects cannot be separated from each other. In data science, this problem is encountered when there is a variable other than the predictor variable that may have caused the effect being studied. The variable causing the confounding reduces the internal validity of the analysis in that one cannot say for sure that the predictor variable caused the effect. This variable changes with the predictor but was not intended to do so. As a result, the outcome cannot be attributed to the predictor variable but may well have been caused by the other variable, the confounder. For example, manufacturing defects in a dielectric layer (such as voids) may not be present due to any processing conditions during that process step for with the layer was deposited but during a downstream step where a subsequent thermal annealing process caused cracking or delamination in the dielectric layer under consideration.

Machine Learning (ML) is an application of AI that creates systems that have the ability to automatically learn and improve from experience. ML involves the development of computer programs that can access data and learn based on that data. ML algorithms typically build mathematical models based on sample, or training, data in order to make predictions or decisions without being explicitly programmed to do so. The use of training data in ML requires human intervention for feature extraction in creating the training data set. The two main types of ML are Supervised learning and Unsupervised learning. Supervised learning uses labeled datasets that are designed to train or "supervise" algorithms into classifying data or predicting outcomes accurately. Supervised learning is typically used for problems requiring classification or regression analysis. Classification problems use an algorithm to accurately assign test data into specific categories. Regression is a method that uses an algorithm to understand the relationship between dependent and independent variables. Regression models are helpful for predicting numerical values based on different data points.

Unsupervised learning uses machine learning algorithms to analyze and cluster unlabeled datasets. These algorithms discover hidden patterns or data groupings without the need for human intervention, and their ability to discover similarities and differences in information make unsupervised learning the ideal solution for exploratory data analysis, cross-selling strategies, customer segmentation, and image recognition. Unsupervised learning is typically used for problems requiring clustering, e.g., K-means clustering, or association, which uses different rules to find relationships between variables in a given dataset.

Deep learning is a sub-field of ML that automates much of the feature extraction, eliminating some of the manual human intervention required and enabling the use of larger data sets. Deep learning typically uses neural networks, which are highly interconnected entities, sometimes called artificial neurons. Each artificial neuron connects to another and has an associated weight and threshold. An artificial neuron multiplies the input data with the weight, which either amplifies or dampens that input, thereby assigning significance to inputs with regard to the task the algorithm is trying to learn. If the output of any individual artificial neuron is above the specified threshold value, that artificial neuron is activated, sending data to the next layer of the network. Otherwise, no data is passed along to the next layer of the network. A neural network that consists of more than three layers can be considered a deep learning algorithm or a deep neural network.

A graph represents the relations (edges) between a collection of entities (nodes). Formally, a graph is a set of distinct vertices (representing items or entities) that are joined optionally to each other by edges (representing relationships). Graph Neural Networks (GNNs) are a class of deep learning methods designed to perform inference on data described by graphs, including node-level, edge-level, and graph-level prediction tasks.

Disclosed herein is a system and computer-implemented method for CRAI and separately a risk framework for manufacturing applications. A propensity function neural network is trained to predict the likelihood of an intervention given other covariate variables, i.e., essentially training a propensity function that determines how the other covariate variables predict the intervention. This neural network is then used as a filter in a system to transform the confounders that are then combined with the intervention in the prediction of the outcome. The idea is roughly that to predict the effect of an intervention on an outcome, only the components of the covariates directly useful for predicting the intervention itself need be considered. The other parts may have good information about predicting the outcome but confound estimates of the interventions effect. Therefore, the disclosed system and computer-implemented method use a propensity function neural network to determine how the other covariate variables predict the intervention, where this neural network is trained to predict an intervention from other covariate variables, and a second outcome neural network is used to determine the effects on the outcome caused only by the covariate variables that are correlated to the intervention. The propensity function and outcome neural networks can be trained simultaneously or separately.

Figure 1:
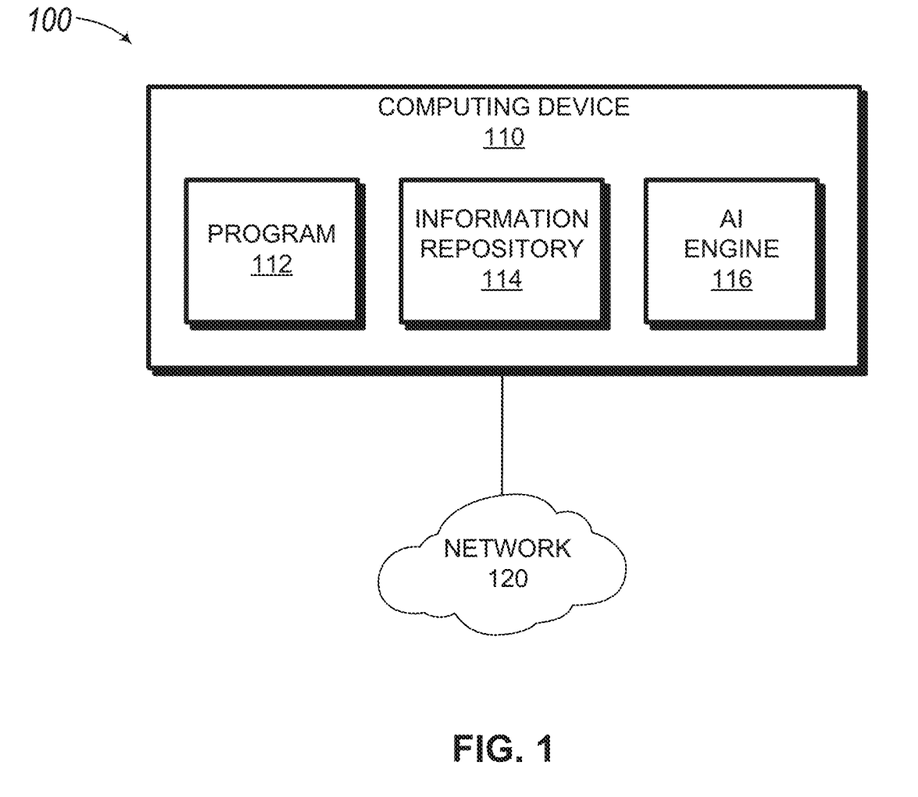
FIG. 1 is a functional block diagram illustrating a distributed data processing environment consistent with the present disclosure.

FIG. 1 is a functional block diagram illustrating a distributed data processing environment, generally designated 100, suitable for operation of program 112, consistent with the present disclosure. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the disclosure as recited by the claims.

Distributed data processing environment 100 includes computing device 110 optionally connected to network 120. Network 120 can be, for example, a telecommunications network, a Local Area Network (LAN), a Wide Area Network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a Personal Computer (PC), a desktop computer, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In some embodiments, computing device 110 includes program 112. In an embodiment, program 112 is a program, application, or subprogram of a larger program for CRAI and risk framework for manufacturing applications. In an alternative embodiment, program 112 may be located on any other device accessible by computing device 110 via network 120.

In some embodiments, computing device 110 includes information repository 114. In an embodiment, information repository 114 may be managed by program 112. In an alternate embodiment, information repository 114 may be managed by the operating system of the computing device 110, alone, or together with, program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, AI data, learning data, confounder data, intervention data, fabrication data, process data, and other data that is received by program 112 from one or more sources, and data that is created by program 112.

Information repository 114 may be implemented using any non-transitory volatile or non-volatile storage media for storing information, as known in the art. For example, information repository 114 may be implemented with Random-Access Memory (RAM), Solid-State Drives (SSD), one or more independent hard disk drives, multiple hard disk drives in a Redundant Array of Independent Disks (RAID), optical library, or a tape library. Similarly, information repository 114 may be implemented with any suitable storage architecture known in the art, such as a relational database, an object-oriented database, or one or more tables.

In some embodiments, computing device 110 includes AI engine 116. In some embodiments, AI engine 116 is a deep learning engine that is used by program 112 for CRAI and risk framework for manufacturing applications. In some embodiments, AI engine 116 may be implemented as one or more GNNs and causal inference models. In other embodiments, AI engine 116 may be implemented in any other form of artificial intelligence as would be known to a person of skill in the art.

In some embodiments, a system and method consistent with the present disclosure implements CRAI for automated failure mode analysis and diagnosis. A Graph Neural Network (GNN) and causal inference model is leveraged to create an embedding that represents the causal and confounding variables. The embedding is trained using downstream dependent variables such as quality-related measurements as outcomes. Observed manufacturing parameters can then be treated as interventions. The trained embeddings are used to reveal the causal relationship. This approach allows leveraging plentiful observational data towards causal diagnosis without creation of addition expensive experiments.

A system and method consistent with the present disclosure thus involves application of graph neural network approaches to structural causal models. The update algorithm of the graph neural networks allows the realization of dependencies between confounding variables and an intervention and outcome. Although specific applications may be discussed herein a system and method consistent with the present disclosure can be applied to a wide variety of metrics within a commercial foundry including yield learning or quantifiably assured manufacturing.

Figure 2:
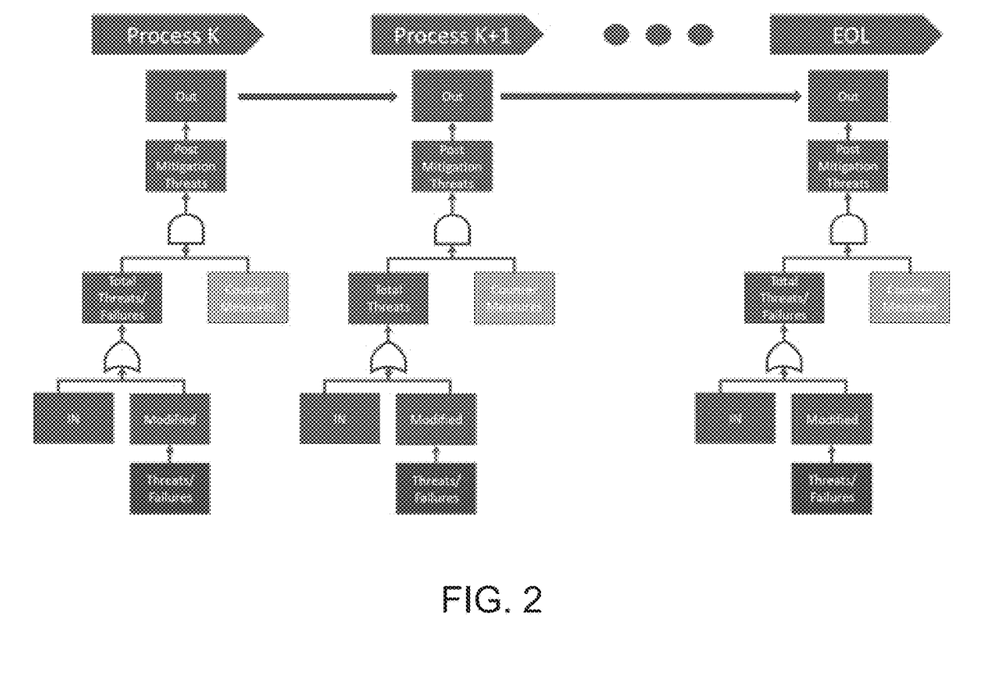
FIG. 2 diagrammatically illustrates a Threat/Failure Dependency Model (TFDM) consistent with the present disclosure.

FIG. 2 diagrammatically illustrates a Threat/Failure Dependency Model (TFDM) consistent with the present disclosure. Some embodiments consistent with the present disclosure may be used in a TFDM framework. The TFDM catalogs the threats, failures, corrections, and resources at each step of manufacture. The goal is to understand the upstream processes in which properties or interest are established to downstream test and functional characteristics. Both failure and threat modes may be identified, and indeed share many functional characteristics.

A TFDM may include logical models at every process step that in turn span the lifecycle. The TFDM will address not only where the threats or failures occur and the data that is collected at that process step, but model the data dependencies that are non-proximal to the failure.

The purpose of the TFDM is to establish statistical evidence of the efficacy of countermeasure strategy (such as defect metrology inspection or process monitoring at specific points) against a set of threats or failures, and to leverage data dependencies to allow countermeasure regimes that span the lifecycle into end-of-line testing, as diagrammatically illustrated in FIG. 2.

Formal establishment of a TFDM may be used to identify new countermeasure techniques for where residual risk of a failure remains high. Take as an example the Shallow Trench Isolation (STI) oxide that isolates transistors to prevent parasitic current leakage. It has been shown that Total Ionizing Dose (TID) can induce charge trapping in the STI and enable progressively higher leakage currents. There exist some mitigation techniques to reduce this parasitic leakage. Additional work has shown that the oxide composition can dramatically affect the defect formation and subsequent current leakage. While STI oxide thickness is monitored during fabrication, oxide composition is likely not normally monitored. Small process drifts in the oxide formation tools/recipes could alter the stoichiometry over time, degrading the final device's radiation performance. Consistent with the present disclosure, oxide composition metrology could be proposed or goodness of fit metrics during the oxide thickness extraction could be leveraged as an additional in-line check to verify the STI oxide is on target. Additional failure modes offer an opportunity to correlate with specified process data that can be leveraged to offer additional quality assurance.

In some embodiments, CRAI consistent with the present disclosure may be implemented for discovering testing relations and a new potential key to predictive analytics is the ability to characterize data inputs into a standardized form that strongly relates to outcome measures. Quality-related measurements taken before and during the manufacturing process are typically evaluated one at a time and will not indicate multi-step failures where individual metrology values stay within acceptable quality bounds, but the composite process leads to a failure. The CRAI methodology was developed for processing heterogenous relational data in a way that captures and emphasizes the strongest causal mechanisms between complex inputs and outcome measures.

Figure 3:
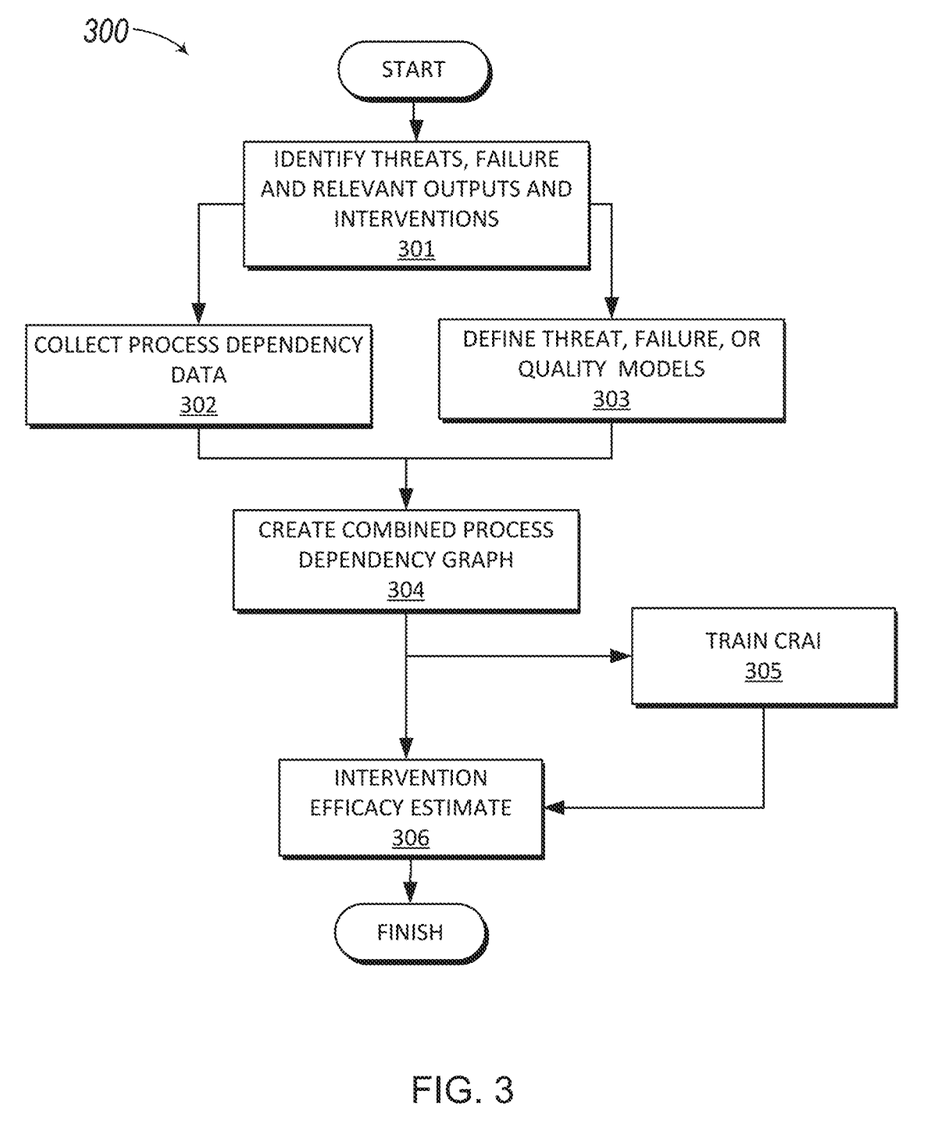
FIG. 3 is a flowchart diagram depicting operations for the program, for CRAI and risk framework for manufacturing applications, on the distributed data processing environment of FIG. 1 consistent with the present disclosure.

FIG. 3 is a flowchart diagram of workflow 300 depicting operations for the program 112, for CRAI and risk framework for manufacturing applications, on the distributed data processing environment of FIG. 1, consistent with the present disclosure. In an alternative embodiment, the operations of workflow 300 may be performed by any other program while working with the program 112.

It should be appreciated that embodiments of the present disclosure provide at least for CRAI and risk framework for manufacturing applications. However, FIG. 3 provides only an illustration of one implementation and does not imply any limitations with regard to the environments in which different embodiments may be implemented. Many modifications to the depicted environment may be made by those skilled in the art without departing from the scope of the disclosure as recited by the claims.

In one example embodiment, the program 112 trains a model to predict the causal effect of the deliberate change of one or multiple manufacturing process parameter(s) (i.e., an intervention) on an outcome of the manufacturing process, such as a quality measure. In the illustrated example embodiment, the program 112 trains a graph neural network connected to a causal inference model to predict whether an intervention has a causal relationship with an outcome when other manufacturing process parameters (covariates) are controlled for. The training data consists of manufacturing process parameters, collected process metrics and outcome measures collected during manufacturing.

The purpose of the approach is twofold: to determine the consequence of a failure or threat that results in a change in the manufacturing process, or to determine what change in manufacture would result in a desired change in outcome variables. In either case, the approach requires determining interventions (as failures, threats, or corrections) and outcome variables.

Prior to executing the program 112, a user first identifies any threats, failures, corrections, and relevant outputs and interventions to be analyzed. The program 112 then receives the threats, failures, corrections, and relevant outputs and interventions from the user (operation 301).

The program 112 collects process dependency data (operation 302). In operation 302, the program 112 constructs manufacturing process dependency graphs from information recorded during manufacturing runs, combined with subject matter expert input regarding the manufacturing process. This graph is composed of nodes that hold manufacturing process parameters and directed edges that indicate timing or process dependencies between the manufacturing process parameters. Each manufacturing process parameter can act as a candidate intervention.

The program 112 defines threat, failure, or quality models (operation 303). In operation 303, the program 112 defines the intervention model, i.e., the threat model, failure model, or quality model, in which the appropriate interventions are identified. Interventions may be determined directly by the model (e.g., a step that may "fail" whose consequences need to be determined or the anticipated point of manipulation by an adversary). In the case of quality improvements, intervention points may be determined by expert opinion, or standard statistical methods such as correlation.

The program 112 creates a combined process dependency graph (operation 304). In operation 304, the program 112 combines the process dependency graph with threat model intervention set and output variables for training via the CRAI model. If the CRAI model has already been trained, then the program 112 proceeds to operation 306.

The program 112 trains the CRAI model (operation 305). The operations for training the CRAI model are explained in FIGS. 4A and 4B below.

The program 112 estimates the intervention efficacy (operation 306). Based on the causal inference model, the program 112 determines, in operation 407B of FIG. 4B below, if a causal relationship was found between the intervention and the outcome. If the program 112 determines that a causal relationship was found between the intervention and the outcome, then the program 112 estimates the Intervention Efficacy Estimate (IEE). The IEE is an approximation of the expected intervention effect. That is, a prediction of how the outcome will change if the intervention is deliberately modified but other parts of the system are not intervened upon.

If any candidate interventions remain, then the program 112 returns to operation 302 to process the next intervention. Once all candidate interventions have been processed, the program 112 then ends for this cycle.

Figure 4A:
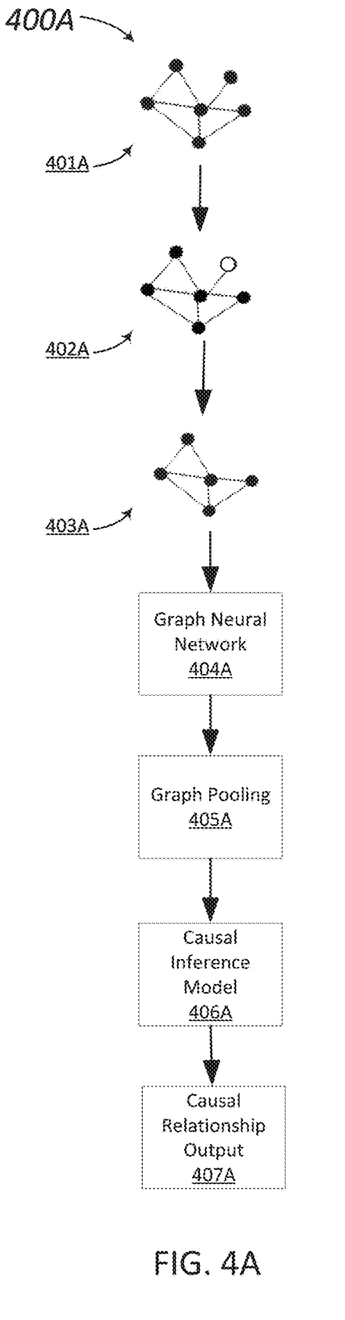
FIG. 4A is a graphical representation of training and using the trained CRAI model consistent with the present disclosure.

FIG. 4A is a graphical representation of training the CRAI model consistent with the present disclosure. The operations for training the CRAI model in an example embodiment are explained in FIG. 4B below. Diagram 401A shows a manufacturing process dependency graph. This is explained in operation 401B below. Diagram 402A illustrates the selection of an intervention node (white circle). This is explained in operation 402B below. Diagram 403A illustrates the removal of the intervention node from the manufacturing process dependency graph. This is explained in operation 403B below. Diagram 404A illustrates a GNN that will be used to process the manufacturing process dependency graph. This is explained in operation 404B below. Diagram 405A illustrates graph pooling that will be used to create a vector embedding. This is explained in operation 405B below. Diagram 406A illustrates a causal inference model that will be used to process the vector embedding. This is explained in operation 406B below. Diagram 407A illustrates the causal relationship output. This is explained in operation 407B below.

Figure 4B:
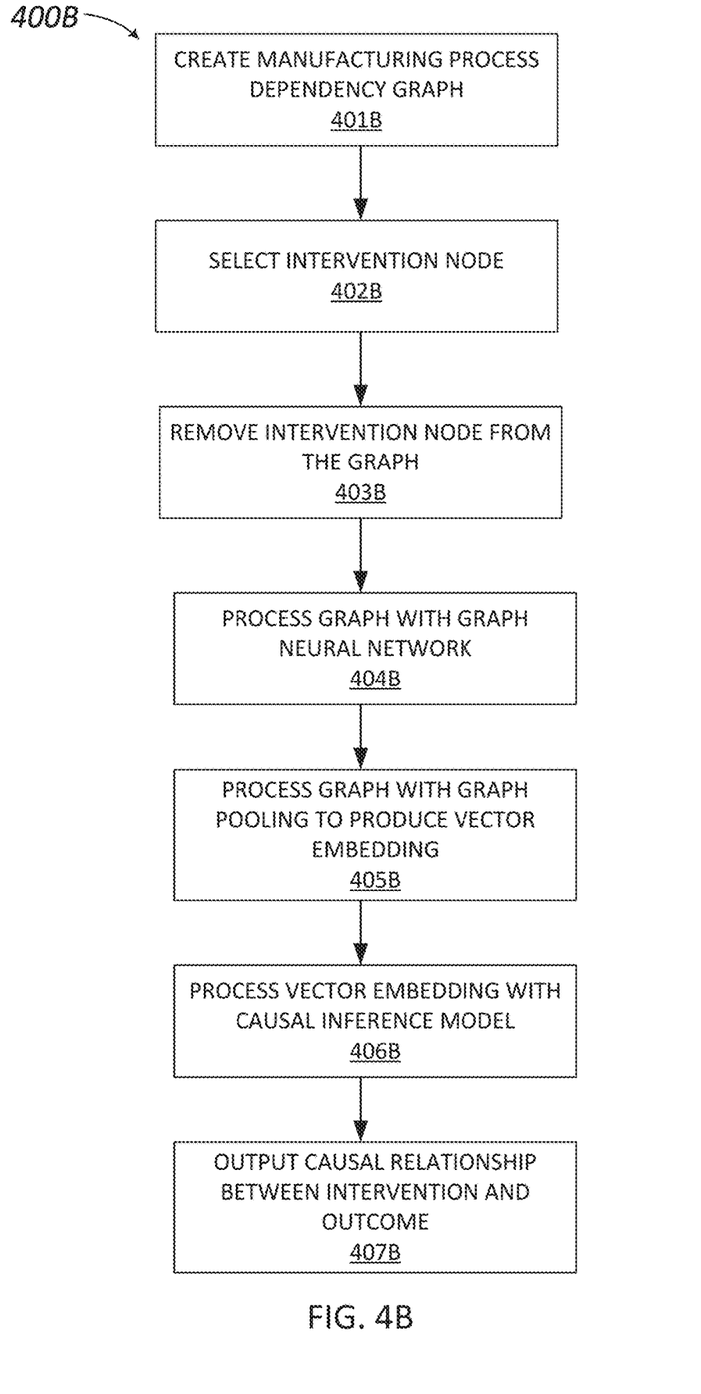
FIG. 4B is an example embodiment of a flowchart diagram depicting operations for training and using the trained CRAI model on the distributed data processing environment of FIG. 1 consistent with the present disclosure.

FIG. 4B is an example embodiment of a flowchart diagram depicting operations for training the CRAI model on the distributed data processing environment of FIG. 1 consistent with the present disclosure. In an alternative embodiment, the operations of workflow 300 may be performed by any other program while working with the program 112.

It should be appreciated that embodiments of the present disclosure provide at least for CRAI and risk framework for manufacturing applications. However, FIG. 4B provides only an illustration of one implementation and does not imply any limitations with regard to the environments in which different embodiments may be implemented. Many modifications to the depicted environment may be made by those skilled in the art without departing from the scope of the disclosure as recited by the claims.

The program 112 creates a manufacturing process dependency graph (operation 401B). This is operation 304 from FIG. 3 above.

The program 112 receives a selected intervention node (operation 402B). Once a user of the program chooses a manufacturing process parameter as an intervention, in operation 402B the program 112 receives the selected intervention node from the user. In cases where the intervention is always present but can be observed at different values, it will be necessary to decide what values will be set to intervention=0 or intervention=1, or whether the intervention-outcome relationship will be treated as a regression. This decision will be specific to the manufacturing process parameter.

The program 112 removes the intervention node from the graph (operation 403B). In operation 403B, the program 112 removes the selected intervention from each dependency graph. Dependency graphs may be separated into two or more groups based on the recipe parameter value, indicating whether an intervention was received or not received.

The program 112 processes the graph with a GNN (operation 404B) and creates a combined process dependency graph (operation 405B). In operations 404B and 405B, the program 112 trains a GNN to process the dependency graph to create a numerical vector representation (an 'embedding') that contains information concerning confounding variables.

The program 112 processes the vector embedding with the causal inference model (operation 406B). In operation 406B, the program 112 trains a causal inference model using one of two approaches. In the first approach, the causal inference model defines two models (Q and g) that are trained simultaneously. Q is an intervention outcome model trained to predict the outcome. g describes a model that replaces the propensity score in traditional causal inference models. By training the entire network to optimize these loss functions, the architecture optimizes the ability to correctly predict the outcome given the intervention (Q), and to also adjust for confounding features (g) that impact the outcomes in the final estimation function. In the second approach, Q and g are trained separately.

The program 112 outputs a causal relationship between the intervention and the outcome (operation 407B). In operation 407B, the program 112 determines if a causal relationship was found. Based on the results of the causal inference model in operation 406B, program 112 determines if there is a causal relationship between the intervention and the outcome. The program 112 then returns to operation 306 of FIG. 3.

Figure 5:
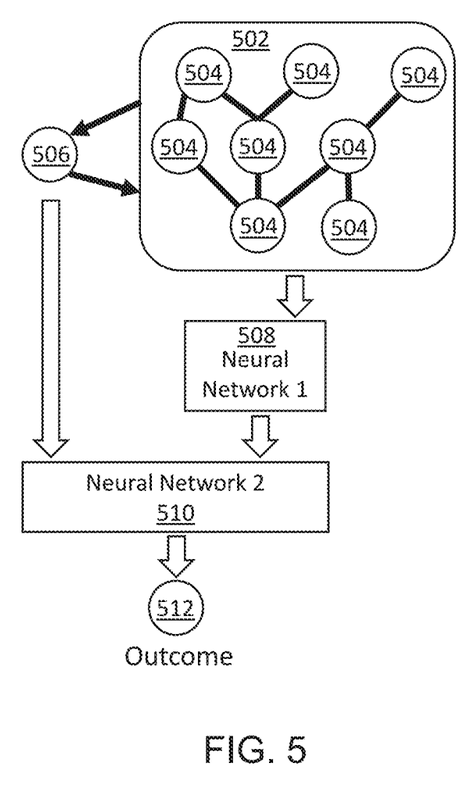
FIG. 5 illustrates an illustrative example flow diagram of one possible embodiment of a system for CRAI on manufacturing applications consistent with the present disclosure.

FIG. 5 illustrates an illustrative example flow diagram of one possible embodiment of a system for CRAI and risk framework for manufacturing applications consistent with the present disclosure. In the example of FIG. 5, causal graph 502 contains a plurality of confounders 504, any of which may affect the outcome 512. Intervention 506 is detected by the system, and neural network_1 508 correlates intervention 506 with the plurality of confounders 504, determining which, if any, of the plurality of confounders 504 are related to intervention 506. The neural network_2 510 then correlates the confounders 504 that are determined to be related to the intervention 506 with the outcome 512. This allows the system to determine which, if any, of the confounders are directly useful for predicting the intervention 506; the trained neural networks are used to predict how a novel value of 506 would impact the outcome variable 512.

Figure 6:
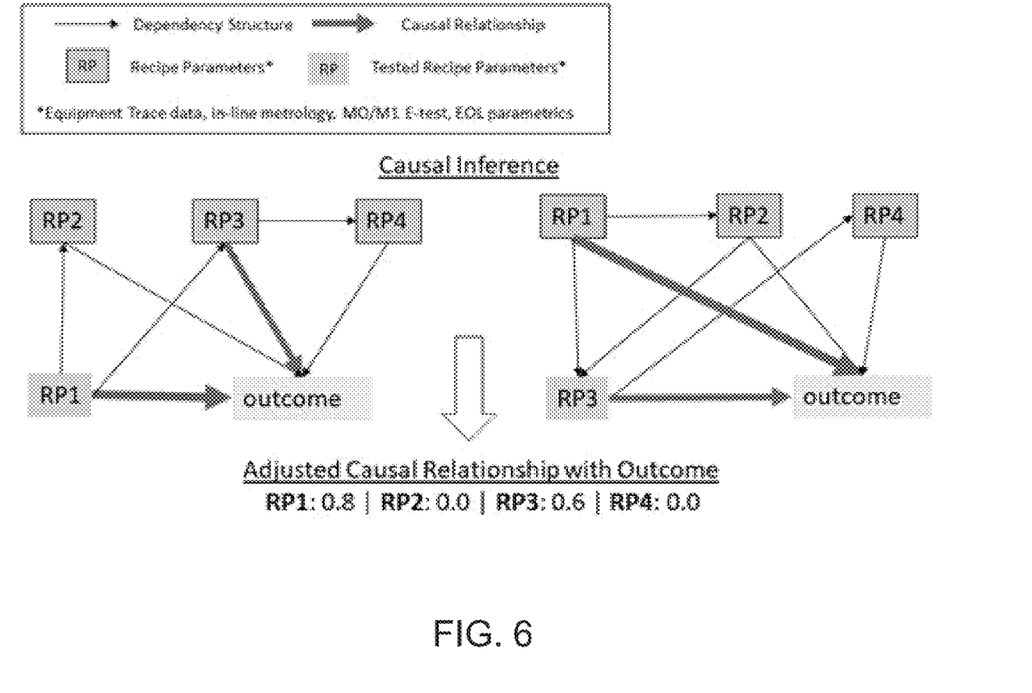
FIG. 6 diagrammatically illustrates one example of a CRAI method consistent with the present disclosure.

FIG. 6 diagrammatically illustrates one example of a CRAI method consistent with the present disclosure. In the illustrated example, relational weights between variables are adjusted with respect to a classified outcome. Using CRAI within the TFDM framework, allows the manufacturing process to be captured into a standardized numerical form, effectively handling incomplete and multi-modal data streams, as well as variability between process runs. CRAI is a combination of heterogenous input synthesis, causal inference, and predictive modeling using GNNs to preserve information stored in dependency structures. By using CRAI within the TFDM framework, one can identify the most important process measurements for quality assurance, anticipate failures that can only be identified through complex interactions between multiple variables, identify failure modes even when process data is limited and propose effective countermeasures. Overall, CRAI can be used to create quantifiable assurance processes that are optimized for increased simplicity and performance.

Figure 7:
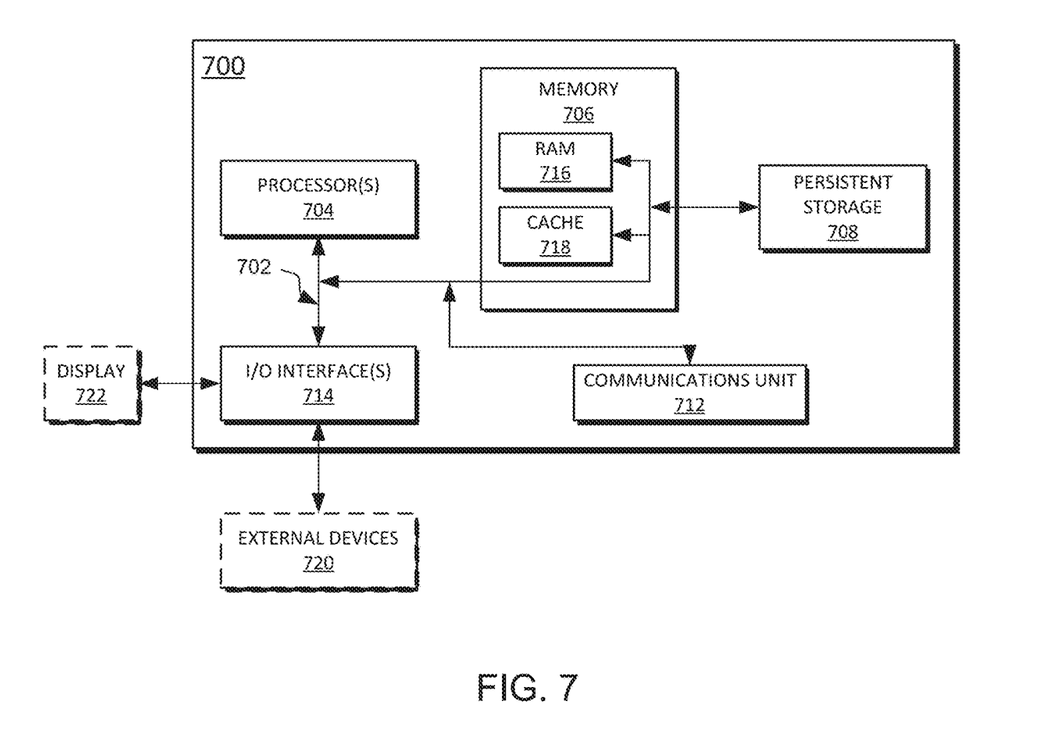
FIG. 7 depicts a block diagram of components of the computing device executing the program within the distributed data processing environment of FIG. 1, consistent with the present disclosure.

FIG. 7 is a block diagram depicting components of one example 700 of the computing device 102 suitable for the program 112, within the distributed data processing environment of FIG. 1, consistent with the present disclosure. FIG. 7 displays the computing device or computer 700, one or more processor(s) 704 (including one or more computer processors), a communications fabric 702, a memory 706 including, a RAM 716 and a cache 718, a persistent storage 708, a communications unit 712, I/O interfaces 714, a display 722, and external devices 720. It should be appreciated that FIG. 7 provides only an illustration of one embodiment and does not imply any limitations with regard to the environments in which different embodiments may be implemented. Many modifications to the depicted environment may be made.

As depicted, the computer 700 operates over the communications fabric 702, which provides communications between the computer processor(s) 704, memory 706, persistent storage 708, communications unit 712, and Input/Output (I/O) interface(s) 714. The communications fabric 702 may be implemented with an architecture suitable for passing data or control information between the processors 704 (e.g., microprocessors, communications processors, and network processors), the memory 706, the external devices 720, and any other hardware components within a system. For example, the communications fabric 702 may be implemented with one or more buses.

The memory 706 and persistent storage 708 are computer readable storage media. In the depicted embodiment, the memory 706 comprises a RAM 716 and a cache 718. In general, the memory 706 can include any suitable volatile or non-volatile computer readable storage media. Cache 718 is a fast memory that enhances the performance of processor(s) 704 by holding recently accessed data, and near recently accessed data, from RAM 716.

Program instructions for the program 112 may be stored in the persistent storage 708, or more generally, any computer readable storage media, for execution by one or more of the respective computer processors 704 via one or more memories of the memory 706. The persistent storage 708 may be a magnetic hard disk drive, a solid-state disk drive, a semiconductor storage device, flash memory, Read Only Memory (ROM), Electronically Erasable Programmable Read-Only Memory (EEPROM), or any other computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

The communications unit 712, in these examples, provides for communications with other data processing systems or devices. In these examples, the communications unit 712 includes one or more network interface cards. The communications unit 712 may provide communications through the use of either or both physical and wireless communications links. In the context of some embodiments of the present disclosure, the source of the various input data may be physically remote to the computer 700 such that the input data may be received, and the output similarly transmitted via the communications unit 712.

The I/O interface(s) 714 allows for input and output of data with other devices that may be connected to computer 700. For example, the I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present disclosure, e.g., the program 112, can be stored on such portable computer readable storage media and can be loaded onto persistent storage 708 via the I/O interface(s) 714. I/O interface(s) 714 also connect to a display 722.

Display 722 provides a mechanism to display data to a user and may be, for example, a computer monitor. Display 722 can also function as a touchscreen, such as a display of a tablet computer.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

According to one aspect of the disclosure there is thus provided a computer-implemented method for causal effect prediction, the computer-implemented method including: identifying, by one or more computer processors, an intervention, wherein the intervention is selected from the group consisting of threats, failures, corrections, and relevant outputs; collecting, by the one or more computer processors, process dependency data; creating, by the one or more computer processors, an intervention model; combining, by the one or more computer processors, the process dependency data and the intervention model to create a combined process dependency graph; training, by the one or more computer processors, a causal relational artificial intelligence (CRAI) model; and determining, by the one or more computer processors, an estimate of an intervention efficacy.

According to another aspect of the disclosure, there is provided a system for causal effect prediction, the system including: one or more computer processors; one or more computer readable storage media; and program instructions stored on the one or more computer readable storage media for execution by at least one of the one or more computer processors, the stored program instructions including instructions to: identify an intervention, wherein the intervention is selected from the group consisting of threats, failures, corrections, and relevant outputs; collect process dependency data; create an intervention model; combine the process dependency data and the intervention model to create a combined process dependency graph; train a causal relational artificial intelligence (CRAI) model; and determine an estimate of an intervention efficacy.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product. The system or computer program product may include a computer readable storage medium (or media) having computer readable program instructions thereon for causing a processor to carry out aspects of the present disclosure.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an EPROM or Flash memory, a Static Random Access Memory (SRAM), a portable Compact Disc Read-Only Memory (CD-ROM), a Digital Versatile Disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or other Programmable Logic Devices (PLD) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for manufacturing process control, the computer-implemented method comprising:
   identifying, by one or more computer processors, an intervention;
   collecting, by the one or more computer processors, process dependency data;
   creating, by the one or more computer processors, an intervention model;
   combining, by the one or more computer processors, the process dependency data and the intervention model to create a combined process dependency graph;
   training, by the one or more computer processors, a causal relational artificial intelligence (CRAI) model with the combined process dependency graph using a Graph Neural Network;
   determining, by the one or more computer processors, whether a causal relationship exists between the intervention and an outcome based on the CRAI model; and
   responsive to determining that the causal relationship exists between the intervention and the outcome, determining, by the one or more computer processors, an Intervention Efficacy Estimate for manufacturing process control based on the combined process dependency graph and the CRAI model.

2. The computer-implemented method of claim 1, wherein the intervention is selected from a group consisting of threats, failures, corrections, and relevant outputs.

3. The computer-implemented method of claim 1, wherein training the CRAI model further comprises:
   selecting, by the one or more computer processors, an intervention node from the combined process dependency graph;
   removing, by the one or more computer processors, the intervention node from the combined process dependency graph;
   processing, by the one or more computer processors, the combined process dependency graph using an artificial intelligence to create a vector embedding;
   processing, by the one or more computer processors, the vector embedding with a causal inference model; and
   determining, by the one or more computer processors, the causal relationship between the intervention and an outcome.

4. The computer-implemented method of claim 3, wherein the artificial intelligence is a graph neural network.

5. The computer-implemented method of claim 3, wherein the causal inference model is a neural network.

6. The computer-implemented method of claim 3, wherein processing the vector embedding with the causal inference model further comprises:
   training, by the one or more computer processors, the causal inference model with an intervention outcome model trained to predict the outcome.

7. The computer-implemented method of claim 3, wherein processing the vector embedding with the causal inference model further comprises:
   training, by the one or more computer processors, the causal inference model with a model that replaces a propensity score in a traditional causal inference model.

8. The computer-implemented method of claim 3, wherein processing the vector embedding with the causal inference model further comprises:
   training, by the one or more computer processors, the causal inference model with an intervention outcome model trained to predict the outcome; and
   training, by the one or more computer processors, the causal inference model with a model that replaces a propensity score in a traditional causal inference model.

9. The computer-implemented method of claim 1, wherein the intervention model includes at least one of a threat model, a failure model, or a quality model.

10. The computer-implemented method of claim 9, wherein the quality model contains intervention points that are determined by correlation.

11. A system for manufacturing process control, the system comprising:
   one or more computer processors;
   one or more non-transitory computer readable storage media; and
   program instructions stored on the one or more computer readable storage media for execution by at least one of the one or more computer processors, the stored program instructions including instructions to:
   identify an intervention;
   collect process dependency data;
   create an intervention model;
   combine the process dependency data and the intervention model to create a combined process dependency graph;
   train a causal relational artificial intelligence (CRAI) model with the combined process dependency graph using a Graph Neural Network;
   determine, by the one or more computer processors, whether a causal relationship exists between the intervention and an outcome based on the CRAI model; and
   responsive to determining that the causal relationship exists between the intervention and the outcome, determine an Intervention Efficacy Estimate for manufacturing process control based on the combined process dependency graph and the CRAI model.

12. The system of claim 11, wherein the intervention is selected from a group consisting of threats, failures, corrections, and relevant outputs.

13. The system of claim 11, wherein train the CRAI model further comprises one or more of the following program instructions, stored on the one or more computer readable storage media, to:
   select an intervention node from the combined process dependency graph;
   remove the intervention node from the combined process dependency graph;
   process the combined process dependency graph using an artificial intelligence to create a vector embedding;
   process the vector embedding with a causal inference model; and
   determine the causal relationship between the intervention and an outcome.

14. The system of claim 13, wherein the artificial intelligence is a graph neural network.

15. The system of claim 13, wherein the causal inference model is a neural network.

16. The system of claim 13, wherein process the vector embedding with the causal inference model further comprises one or more of the following program instructions, stored on the one or more computer readable storage media, to:
   train the causal inference model with an intervention outcome model trained to predict the outcome.

17. The system of claim 13, wherein process the vector embedding with the causal inference model further comprises one or more of the following program instructions, stored on the one or more computer readable storage media, to:
   train the causal inference model with a model that replaces a propensity score in a traditional causal inference model.

18. The system of claim 13, wherein process the vector embedding with the causal inference model further comprises one or more of the following program instructions, stored on the one or more computer readable storage media, to:
   train the causal inference model with an intervention outcome model trained to predict the outcome; and
   train the causal inference model with a model that replaces a propensity score in a traditional causal inference model.

19. The system of claim 11, wherein the intervention model includes at least one of a threat model, a failure model, or a quality model.

20. The system of claim 19, wherein the quality model contains intervention points that are determined by correlation.

* * * * *